United States Patent Office 3,532,677
Patented Oct. 6, 1970

3,532,677
PROCESS FOR REMOVING HIGH BOILING
SOLVENTS FROM POLYMER PRODUCTS
Arthur L. Baron, Rahway, N.J., assignor to Celanese
Corporation, New York, N.Y., a corporation of
Delaware
Filed Sept. 23, 1968, Ser. No. 761,828
Int. Cl. C08g 17/00, 33/00
U.S. Cl. 260—79.3                              7 Claims

ABSTRACT OF THE DISCLOSURE

A process for removing high boiling solvents from solution polymerization products, and especially solution polymers obtained by condensing a diphenol, such as Bisphenol A [2,2-bis(4-hydroxyphenyl)propane] with a di(haloaryl) sulfone, such as 4,4'-dichlorodiphenyl sulfone, wherein a low boiling solvent, i.e., a solvent such as dichloromethane or the like whose boiling point at atmospheric pressure is less than that of a subsequently employed non-solvent, is added to the solution polymerization mixture and the thus-obtained mixture is subsequently added to a hot non-solvent, e.g., water. The claimed process produces a product substantially free of high boiling solvent impurities and the products may be used in any conventional film and sheet application.

---

This invention relates to a method for producing polymers. More particularly, this invention relates to a unique method for the removal of high boiling solvents from polymers so as to produce a substantially solvent free product.

In carrying out a solution polymerization process it is very desirable to use a high boiling solvent as compared to the use of a low boiling solvent, because higher polymerization temperatures are thereby attainable, thus beneficially affecting the physical properties of the polymer product. When using high boiling solvents, the usual means for isolating the polymer product is to add a non-solvent (i.e., water) to the reaction mixture, thus causing the precipitation of the polymer product. Unfortunately, when such a procedure is employed the high boiling solvent is coprecipitated, to a certain extent, with the polymer product and adheres to it, necessitating additional treatment of the polymer.

Such additional treatments have been found to be chemically and economically unsatisfactory. Thus, for example, the obvious technique of oven drying the product is inefficient because of the high boiling point of the solvent, and when the product is oven dried, it is often decomposed before the solvent is substantially removed. Extrusion of the polymer through a vented port is also frequently unsatisfactory, again because of thermal decomposition of the polymer; this treatment often results in a product containing a great number of black specks. Such a product would be undesirable for certain uses, e.g., films, sheets and blown bottles, where film clarity is of the utmost importance.

Oftentimes high boiling solvent, because of the difficulty of its removal, is simply left in the polymer. Aside from the cost of solvent lost in this manner and possible odor problems in the polymer because of the presence of solvent, the retained solvent could act in many cases as a plasticizer, thus affecting various physical properties of the polymer, e.g., its melt strength and melt elasticity.

It has been suggested that the whole problem of solvent removal from polymers can be obviated by initially employing a low boiling solvent in the solution polymerization reaction, one which could be readily removed by means of oven drying, for instance. However, the use of a low boiling solvent greatly restricts the polymerization reaction temperature, consequently a relatively inferior polymer product is obtained. For example, in the reaction of Bisphenol A with a di(haloaryl) sulfone, if an extremely low boiling solvent is employed there will be essentially no product formed. As the solvent is changed, with an increasing boiling point as a basis, a product is obtained with corresponding increases in the molecular weight. However, none of the low boiling solvents will produce a high enough molecular weight product in the same amount of time. Accordingly, the product thus obtained through the use of a low boiling solvent is thermally unstable and extremely brittle. A high molecular weight product may be obtained if the reaction time is extended, but such a technique is commercially not feasible.

The above described difficulties have been overcome by means of the present invention. More particularly, we have now discovered a novel solution polymerization method, hereinafter described in detail, which provides for convenient and economical removal of high boiling solvents for solution polymer products. In the subject solution polymerization method, solvent removal is readily accomplished by treating the reaction mixture directly, rather than through a series of steps such as precipitating, dissolving, evaporating, etc., thus cutting the time and cost elements.

The subject invention is accomplished by adding a low boiling solvent to a solution polymerization reaction mixture, which is preferably solvated by a high boiling solvent but may also be solvated by a mixture of high and low boiling solvents, after the polymerization reaction has been substantially completed. Preferably, the low boiling solvent is miscible with the reaction solution in order that a one phase liquid system be maintained. Depending on the reactants used and the polymer purity desired, the resulting solution may be filtered to remove any salts precipitated as a result of the addition of the low boiling solvent. The reaction solution containing the low boiling solvent, or filtrate if a filtering step is employed, is then added to a hot liquid which is a non-solvent for the polymer. The addition of the reaction solution containing the low boiling solvent is preferably accomplished in a dropwise manner. This causes the high boiling solvent to flash off with the low boiling solvent. The product which is precipitated may then be oven dried and a polymer substantially free of the high boiling solvent is obtained.

The high boiling polymerization solvents that may be employed in the present invention are those solvents commonly used in solution polymerization reactions which are well known in the art. It is axiomatic to those skilled in the art, that a high boiling solvent is a solvent having a boiling point of at least 100° C. at atmospheric pressure. Examples of high boiling solvents, to cite a few, are dimethylsulfoxide, diethylsulfoxide, tetramethylene sulfoxide, dimethylsulfoxide, diethylsulfoxide, tetramethylene sulfoxide, diphenylsulfone, dimethylsulfone, diethylsulfone, diisopropylsulfone, hexamethylphosphoramide, diethylene glycol, dimethylacetamide, dimethylformamide, nitrobenzene and the like.

In the reaction of Bisphenol A with a di(haloaryl) sulfone, hereinbefore referred to, a particularly preferred solvent is dimethylsulfoxide. Previous methods for conducting this reaction dictated the use of dimethylsulfoxide because of the difficulty of removing other solvents. By means of the instant invention, the number of solvents that may be employed for this particular reaction has been substantially increased. For instance, hexamethylphosphoramide, dimethylacetamide and dimethylformamide are now useable as reaction solvents in polysulfone reactions because of the ease of removal of the high boiling solvent afforded by the instant invention.

The low boiling solvents that may be employed in the present invention are added to the solution polymerization reaction mixture in ratio amounts of from about 1:1 to about 10:1 or higher based on the weight amount of reaction mixture. Preferably the weight ratio of low boiling solvent to reaction mixture is from 2:1 to about 5:1. The low boiling solvent may be any common low boiling compound which is a solvent for the polymerization product and is preferably miscible with the reaction mixture. Examples of low boiling solvents are methylene chloride, ethylene chloride chloroform, tetrachloroethylene, carbon tetrachloride, chlorobenzene, o-dichlorobenzene, acetone, methylethyl ketone and the ilke. The boiling point of the low boiling solvent is less than the boiling point of the non-solvent, and preferably the low boiling solvent has a boiling point at least 10° C. less than the boiling point of the non-solvent.

The non-solvent may be any compound which is not a solvent for the polymer product and which does not impart any permanent chemical alterations to the polymer product. The boiling point ofthe non-solvent is higher than the boiling point of the low boiling solvent and preferably is at least 10° C. above the boiling point of the low boiling solvent. The non-solvent should be heated prior to the addition of the reaction mixture and preferably is heated to the temperature of its boiling point. Water is the preferred non-solvent primarily because of its cost and ease of removal from the system. However, as previously indicated, any non-solvent for the polymer, and particularly glycols and glycol ethers such as tertiary butyl alcohol, ethylene glycol, diethylene glycol, triethylenglycol, the dimethylethers of diethylene gyco, and the like, can be employed.

In accordance with the present invention, the solution polymerization reaction will generally be conducted at temperatures above room temperature (about 25° C.), with temperatures between room temperature and the boiling point of the high boiling solvent being most common. Thus, in the production of polysulfones the preferred high boiling solvent, dimethylsulfoxide, is not shown to advantage unless the reaction is carried out at temperatures somewhat above room temperature and, therefore, reaction temperatures in excess of 100° C. e.g., from about 140° C. to about 190° C. are preferred.

A low boiling solvent is then added to the reaction solution after the polymerization reaction has been substantially completed and immediately the solution is added to the hot non-solvent in a dropwise manner. Upon contact of the reaction solution with the hot non-solvent the high boiling solvent is flashed off overhead, along with the low boiling solvent and the hot non-solvent. The phrase "substantially completed" is meant to include not only the polymerization reaction per se. but additional reactions to the polymer product such as treatment to render the polymer product thermally stable by means of, for instance, end-capping.

The low boiling solvent is preferably at room temperature when added to the reaction solvent, however, the temperature of the low boiling solvent may range from 20° C. below room temperature or lower to 20° C. above room temperature or higher (e.g., from about 5° C. to about 45° C.) when added to the reaction solvent.

The particle size of the polymer precipitated from the hot non-solvent may be varied according to the degree of turbulence of the non-solvent when the reaction mixture is dripped therein. If a very fine particle size is desired, the hot non-solvent should be rapidly agitated by means of a conventional mechanical stirrer, or by any other means for agitation well known in the art, such as for instance, super heating of the non-solvent or introduction of the reaction mixture in super heated vapor form into the non-solvent.

For purposes of illustration, the present invention is favorably demonstrated in the preparation of a polyetherpolysulfone. Such a process is disclosed and claimed in British Pat. 1,060,546 issued to Minnesota Mining & Manufacturing Co. However, it is understood that the present invention may be employed in any standard polymerization reaction well known in the art (i.e., the preparation of polyesters, polyethers and the like).

As previously mentioned, the present invention obviates the difficulties inherent in solution polymerization reactions nad consequently, the products produced thereby can be freely used without fear of the presence of odor or color defects. Accordingly, the polymeric products produced by the present invention may be used as films, sheets and in blown or molded bottles to mention a few applications.

The following examples are illustrative of the present invention and are not intended to limit the same in any manner.

EXAMPLE I

To a 500 milliliter, four necked flask equipped with mechanical stirrer, Barret trap, nitrogen sparge and thermometer-thermowell, 34.2 grams of Bisphenol A (0.15 mole) 17.3 grams of potassium hydroxide (0.31 mole, assayed), 15 milliliters of water, 75 milliliters dimethylsulfoxide (DMSO) and 125 milliliters of o-xylene were added. The temperature was gradually raised to 135° C. with vigorous agitation and constant sparging with dry nitrogen. As the water was removed the temperature rose to 155° C. After 1½ hours, substantially all of the water had been removed. The Barret trap was then removed and replaced with a water cooled Friedrichs condenser and 43.0 grams (1.15 mole) of 4,4'-dichlorodiphenylsulfone were added along with 50 milliliters of DMSO. The polymerization was carried out for 6.0 hours at 150° C. The temperature was then lowered to 100° C. and methyl chloride gas was introduced into the reaction mixture for 10 minutes with vigorous agitation. The temperature was subsequently lowered to 30° C. and the reaction mixture was poured into 3 liters of methylene chloride and rapidly filtered through a coarse, folded filter paper. The filtrate was allowed to drip into a boiling, rapidly agitated 3 necked flask containing four liters of water, at a rate of one drop every 15 seconds. A finely divided white powder was obtained after filtration of the water. The organic solvents were removed overhead through a Claisen distillation head. The polymer was dried in a vacuum oven at 146° C. for 24 hours. The yield was 66.6 grams (100%). A sample of this polymer was analyzed for DMSO according to the procedure hereinafter described and was found to contain substantially no DMSO. The polymer prepared had the repeating formula:

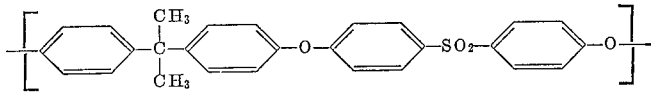

EXAMPLE II

Identical to Example I with the same product being produced and substantially no DMSO present in the product except that:

(a) The polymerization was carried out at 175° C. for 2.5 hours.

(b) The reaction mixture was poured into 3 liters of chlorobenzene.

EXAMPLE III

Identical to Example I with the same product being produced and substantially no hexamethylphosphoramide present in the product, except that:

(a) Hexamethylphosphoramide was used in place of DMSO.
(b) The polymerization was carried out at 145° C. for 18 hours.
(c) Analysis for residual hexamethylphosphoramide was via elemental analysis for phosphorus.

EXAMPLE IV

To a flask fitted with a stirrer, Dean-Stark attachment and a gas inlet tube, through which nitrogen was introduced to replace air, 200 milliliters of dimethylformamide were added. This was followed by he addition of 25.0 grams (0.1 mole) of 4,4'-disulfhydrylidiphenyl sulfide, 20 milliliters of benzene and 112.0 grams (0.2 mole) of potassium hydroxide in 30 milliliters of water. The flask was heated with continuous stirring and refluxing until no more water separated out in the Dean-Stark receiver. Most of the benzene was then distilled off. After the mixture was cooled to 30–40° C. with the introduction of nitrogen, 34.0 grams (0.1 mole) of 4,4'-dibromobenzophenone were added, and the flask was heated for four hours on an oil bath at 130–140° C. The reaction mixture was cooled to room temperature, diluted with 3 liters of acetone and filtered. The filtrate was allowed to drip into a boiling, rapidly agitated 3 necked flask containing five liters of water at a rate of one drop every ten seconds. A finely divided white powder was obtained after filtration of the water. The organic solvents were removed overhead through a Claisen distillation head. The product was dried at 140° C. under vacuum for 16 hours. The yield was 50 grams (93%). Elemental analysis revealed no nitrogen, hence the product contained no dimethylformamide solvent. The polymer prepared had the repeating formula:

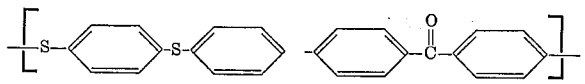

EXAMPLE V

A mixture of 7.87 grams (0.023 mole) adipolychloride, 4.73 grams (0.023 mole) hydroquinone and 20 milliliters nitrobenzene was placed in a 100 milliliter three necked flask equipped with a condenser protected with a drying tube. The reaction mixture was heated slowly by means of an oil bath to 140–147° C. over a period of 2½ hours and then maintained at that temperature for an additional 6 hours. A slow stream of nitrogen was passed through the reaction mixture during the course of reaction. After cooling to room temperature, the reaction mixture was poured into 3 liters of chlorobenzene and filtered. The filtrate was allowed to drip into a boiling, rapidly agitated 3 necked flask containing five liters of water at a rate of one drop every 15 seconds. A slightly off white powder was obtained after filtration of the water. The organic solvents were removed overhead through a Claisen distillation head. The product was dried for 2 hours at 147° C./0.9 mm. the yield was 5.0 grams (100%. Elemental analysis showed no nitrogen, hence all the nitrobenzene had been removed. The polymer prepared had the repeating formula:

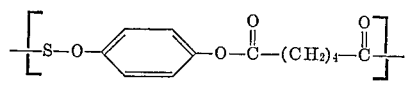

The dimethyl sulfoxide content is determined by means of titration with hydriodic acid. The test depends upon the reduction of DMSO by hydriodic acid to dimethyl sulfide, iodine and water. Only a high quality hydriodic acid, 55–60%, containing no hypophosphorous acid preservative should be used. The reagent should have only a very slight yellow color and require less than 0.1 milliliter of 0.1 N sodium thiosulfate to titrate the free iodine in 5 milliliters of the reagent. When it has been determined that the HI is satisfactory, two milliliters or less of material to be tested are weighed to the nearest 0.0001 gram. The total sample weight should not exceed two grams because of the effects of dilution and should contain between 0.05–0.20 gram of DMSO. This is added to 10 milliliters of glacial acetic acid in a 250 milliliter Erlenmeyer flask. If the sample is 0.5 gram or less, the test can proceed after complete mixing of the reactants. However, if the sample is between 0.5–2.0 grams, the mixture should be swirled for ten minutes before continuing. 10 milliliters of 25% sodium acetate are then added and subsequently, diluted to approximately 100 milliliters with distilled water. The liberated iodine is then titrated with 0.1 N sodium thiosulfate to a light yellow color. 1–2 milliliters of one percent soluble starch solution is then added and the titration is continued until the disappearance of color.

A reagent blank is run in similar fashion using all of the above reagents except the DMSO sample. The quantity of sodium thiosulfate used in the blank determination is subtracted from the amount used in the test procedure.

The percent dimethyl sulfoxide (millequivalent) weight 0.03906) is calculated as follows:

$$\text{Percent DMSO} = \frac{(\text{mls. thiosulfate})(\text{test minus blank})(\text{normality of thiosulfate})(0.03906)(100)}{\text{Sample Weight}}$$

It is to be understood that the foregoing detailed description is given merely by way of illustration and that many variations may be made therein without departing from the spirit of this invention.

What is claimed is:

1. A process for producing a substantially solvent-free polymer selected from the group consisting of polysulfones, polyesters and polyethers by means of treating a solution polymerization reaction mixture containing a polymer product solubilized by a solvent system consisting of a high boiling solvent, said high boiling solvent having a boiling point of at least 100° C., which treatment comprises:
   (a) adding a low boiling solvent to the reaction mixture when the solution polymerization reaction is substantially completed, wherein said low boiling solvent is miscible with said reaction mixture;
   (b) adding the reaction mixture containing said low boiling solvent to a hot non-solvent, said hot non-solvent is selected from the group consisting of water, glycols, glycol ethers and tertiary butyl alcohol, whereby the high boiling solvent and low boiling solvent are flashed off and the polymer product is precipitated; and subsequently
   (c) collecting the substantially solvent-free polymer product, with the proviso that the boiling point of said low boiling solvent is at least 10° C. below the boiling point of said nonsolvent.

2. The process of claim 1 wherein said hot nonsolvent is in a boiling state.

3. The process of claim 1 wherein said hot nonsolvent is water.

4. The process of claim 1 wherein the reaction mixture containing said low boiling solvent is added to the hot non-solvent in a drop-wise manner.

5. The process of claim 1 wherein the low boiling solvent is dichloromethane.

6. The process of claim 1 wherein the low boiling solvent is added to the reaction mixture in ratio amounts by weight of from 1:1 to about 10:1 and higher.

7. The process for producing a substantially solvent-free polysulfone composition by means of treating a solution polymerization reaction mixture containing a polysulfone product solubilized by a high boiling solvent selected from the group consisting of dimethylsulfoxide, hexamethylphosphoramide, dimethyl-acetamide and dimethylformamide, which treatment comprises:
  (a) adding a low boiling solvent to the reaction mixture when the solution polymerization reaction is substantially completed, wherein said low boiling solvent is miscible with said reaction mixture;
  (b) adding the reaction mixture containing said low boiling solvent to a hot non-solvent, said hot non-solvent is selected from the group consisting of water, glycols, glycol ethers and tertiary butyl alcohol, whereby said high boiling solvent and said low boiling solvent are flashed off and the polysulfone product is precipitated; and subsequently
  (c) collecting the substantially solvent-free polysulfone product,
with the proviso that the boiling point of said low boiling solvent is at least 10° C. below the boiling point of said non-solvent.

References Cited

UNITED STATES PATENTS

| | | | |
|---|---|---|---|
| 2,957,855 | 10/1960 | McLeod | 260—88.2 |
| 2,984,649 | 5/1961 | Miller et al. | 260—78.4 |
| 2,989,503 | 6/1961 | Jibben | 260—47 |
| 3,179,642 | 4/1965 | Pflegerl et al. | 260—88.2 |
| 3,281,215 | 10/1966 | Koble | 23—285 |

FOREIGN PATENTS

| | | |
|---|---|---|
| 971,227 | 9/1964 | Great Britain. |
| 1,407,301 | 6/1965 | France. |

WILLIAM H. SHORT, Primary Examiner

M. GOLDSTEIN, Assistant Examiner

U.S. Cl. X.R.

260—47, 49, 75, 79, 96

PO-1050
(5/69)

UNITED STATES PATENT OFFICE
CERTIFICATE OF CORRECTION

Patent No. __3,532,677__   Dated __October 6, 1970__

Inventor(s) __Arthur L. Baron__

It is certified that error appears in the above-identified patent and that said Letters Patent are hereby corrected as shown below:

In the specification, Column 2, lines 58 and 59 delete -- dimethylsulfoxide, diethylsulfoxide, tetramethylene sulfoxide--

In Column 3, line 34, the word "gyco" should read -- glycol --

In Column 4, line 13, "i.e." should read -- e.g. --
In Column 4, line 17, the word "nad" should read -- and--
In Column 5, line 16, the word "he" should read --the--
In Column 5, line 42, the letter "S" should be inserted into the formula after the second and before the third diagram. It should read as follows:

In Column 5, line 67 and 68, the letter "S" which appears in the beginning of the formula should be omitted. It should read as follows:

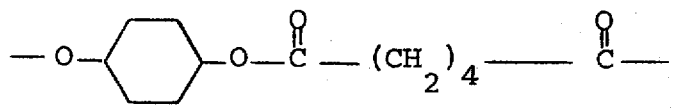

SIGNED AND
SEALED
DEC 8 1970

(SEAL)
Attest:

Edward M. Fletcher, Jr.
Attesting Officer

WILLIAM E. SCHUYLER, JR.
Commissioner of Patents